Oct. 2, 1934. A. R. LAWSON Re. 19,332

MANUFACTURE OF MANIFOLDING BOOKS

Original Filed Aug. 19, 1925 2 Sheets-Sheet 1

Inventor
A. R. Lawson
by J. Edw. Maybee ATTY

Oct. 2, 1934. A. R. LAWSON Re. 19,332

MANUFACTURE OF MANIFOLDING BOOKS

Original Filed Aug. 19, 1925 2 Sheets-Sheet 2

Inventor
A. R. Lawson
By J. Edw. Maybee
ATTY.

Reissued Oct. 2, 1934 Re. 19,332

UNITED STATES PATENT OFFICE 19,332

MANUFACTURE OF MANIFOLDING BOOKS

Albert R. Lawson, Hamilton, Ontario, Canada, assignor, by mesne assignments, to Moore Corporation, Limited, Toronto, Ontario, Canada, a corporation of Ontario, Canada Original No. 1,639,040, dated August 16, 1927, Serial No. 51,257, August 19, 1925. Application for reissue June 1, 1931, Serial No. 541,480. In Great Britain August 28, 1924

10 Claims. (Cl. 282—12)

Figures 1, 2:
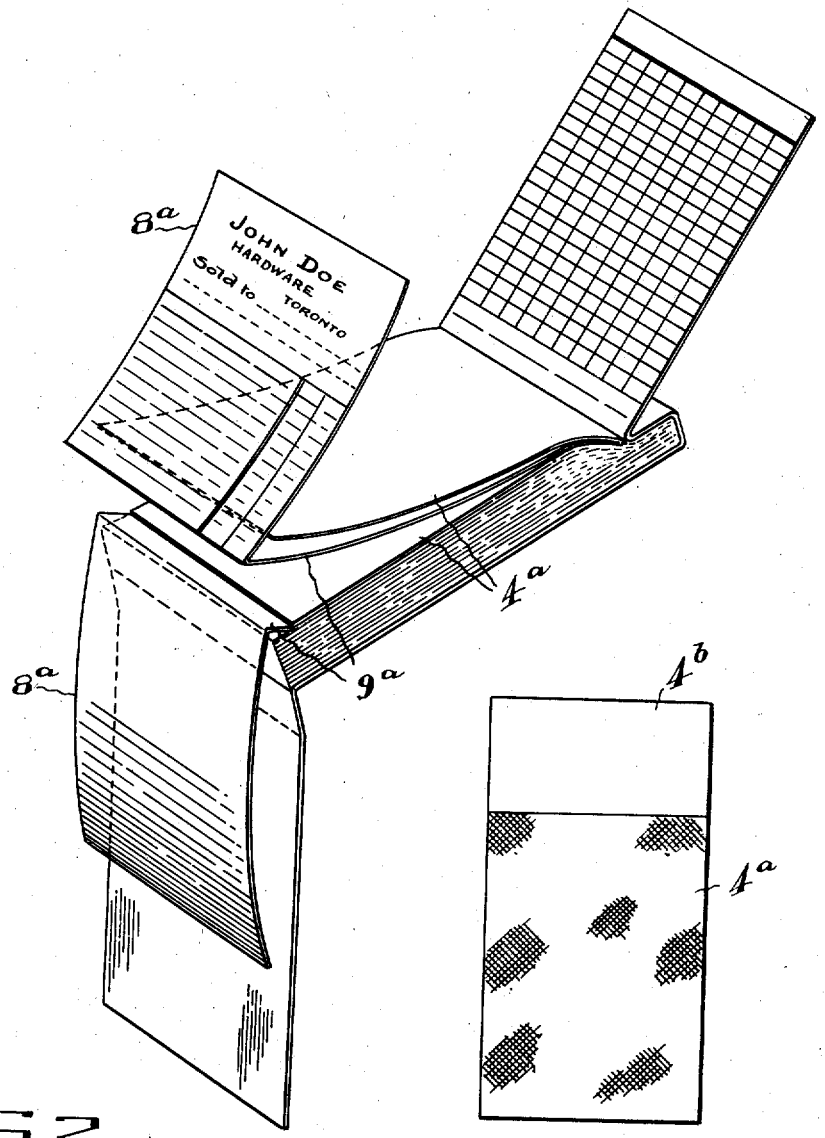

This invention relates to manifolding books and the like using carbon sheets as a means to provide an original and one or more copies at one writing, as set forth in my application Serial No. 1,608, filed January 10, 1925.

In one form of carbon leaf book heretofore employed the same carbon is used over and over again and it is expected to make fifty legible copies, but it is frequently found that after making a number of copies the writing becomes somewhat faint and illegible, especially if a good carbon paper is not used. There is also a tendency for the first few copies to be heavy on account of the carbon sheet having to be thickly coated with carbon in order to last throughout the fifty sheets, and these heavy copies are smeary and liable to soil the hands of the operator. The writing is also usually repeated over the same surface of each original sheet, since in the case of sales slips, the name and address line and other data are always in the same relative position on the sheet, as well as the lines for the articles purchased. Repeated copies are thus made with the same parts of the carbon sheet, leaving the later copies very indistinct and often unreadable.

Repeated writing over the same spot also often results in a hole being worn in the carbon sheet and no copy of the writing being recorded.

Repeated transferring of the carbon sheet from one set of leaves to the next, frequently results in the sheet being wrinkled or creased, the corners turned over, parts detached or the carbon sheet losing its crispness so that it will not be flat. The result is poor copies or only copies of part of the written matter appearing on the duplicate sheets.

With each succeeding set of leaves it is necessary to insert the carbon sheet and in so doing there is a tendency to soil the fingers. This also takes up valuable time when a customer is waiting to be served. In case loose carbon sheets are used there is the danger of inserting them with the carbonized surface up instead of down, which causes a copy to be made on the back of the original and no copy to appear on the face of the duplicate. Again the sheet may be wrongly positioned causing part of the writing to be omitted.

In another form of book, the back of the original sheet is carbonized, and also the back of the duplicate if a triplicate copy is required. This form of book is objectionable on account of the original sheet, which is the one usually given out, having a heavy coat of carbon on its back, which is liable to soil the hands of the person using the book. There is also a tendency for the carbon to rub off on the sheet immediately below the carbonized sheet, thus soiling it and partly obliterating the copy made thereon. When the carbon copies are removed and placed with other papers they are very objectionable because of the carbon rubbing off and soiling such papers. Also if they are mixed with other papers, they transfer to the one immediately above or below writing that may be written on sheets lying above. They are also objectionable because of their liability to soil goods if wrapped with the same, making their use impracticable where certain classes of merchandise are handled. The carbonizing on the back of the sheet is objectionable to the person receiving it, on account of its liability to soil the hands or anything that it may come in contact with, and for this reason in many cases it is thrown away, thus making it necessary for the merchant to refer more frequently to his records and to furnish customers with an itemized account.

An effective method of advertising in sales books is to print an advertisement on the back of a sales book sheet; when the sheet is carbonized this method of advertising cannot be used.

Further in this form of book it is necessary to use a very good quality of paper with sufficient weight and sizing to prevent the absorption of too much of the carbon, thereby adding very materially to the bulk and the cost of the book, since too much absorption of the carbon is objectionable for the following reasons.

1. Penetration through the paper to the front of the leaf, thus discoloring the same and causing the writing thereon to be indistinct.

2. Too much absorption by the paper reduces the copying qualities of the carbonizing material.

3. Increased cost because of the quality of carbonizing material required.

My object in the present invention is to devise a manifolding book which will present the advantages of both forms of book with as few of their disadvantages as possible. That is I aim to produce a book which is easy to handle, which will always present clean sharp copies, in which neither the original nor any duplicate requires to have a carbon coated back, which will be as cheap or nearly as cheap to produce as any book for the same purpose and which will be of but little greater bulk than such books.

I attain my object by interleaving with each set of leaves in the book a separate carbon sheet or sheets so that each carbon sheet is used with but one original. This necessitates the use of a special carbon sheet since the bulk of the book must not be greatly increased, and, if the cost of the book is not to be increased, this special carbon sheet must be produced at a much less cost than that of the ordinary carbon sheet because of the greater number required. I have succeeded in producing such a sheet by applying a very light coat of carbon to a cheap thin paper, thereby producing a carbon sheet having characteristics differing from those of the carbon paper intended for making numerous copies such as that which is now commonly in use.

A carbon sheet meeting the requirements of making many copies, and adapted to prevent carbon passing through the same and transferring copies from the uncarbonized side of the sheet must be made from non-porous closely woven paper and must also be sufficiently tenacious to stand repeated impressions of pencil, pen or manifolding machines so as to give a reasonable number of copies before it becomes worn through or becomes cut or torn.

The requirements for a suitable paper for my purpose are, however, entirely different, and various makes of tissue paper of the cheaper grades will answer the purpose. I find, for example, that a very thin open-pored, bleached sulphite tissue paper answers the purpose, and can be bought at a price that permits of this carbon paper being produced at a cost that enables me to supply each set of manifolding leaves with the necessary carbon sheets, if this be done by mechanical means in the manner hereinafter described.

One of the essential features of a carbon paper of the kind in common use is the making of many copies by repeated writings and a heavy coating of transfer material must be employed. The carbon sheet suitable to my purpose is required to make but one legible copy and as near as it is mechanically possible only a sufficient thickness of carbon material to do this is applied to this thin sheet of paper, the coating indeed being usually so thin that the minute openings usually found extending through the paper employed are not entirely filled, the result being that in many cases one impression removes it, substantially, and leaves the impression in white on a black background. In most cases it will be found that when a suitable paper is properly coated, light passes freely through many of the interstices as though the sheet were a fine network of interlacing fibres. I find that this carbon paper can be produced at a much less cost than carbon paper now used for making many copies, and that the saving effected by using this lightly carbonized thin paper and by using the new process of manufacture hereinafter referred to is such that manifolding forms can be produced at a little or no greater cost than manifolding forms known as "carbon leaf" and "automatic", and with very little increase of bulk.

To make manifolding books with a carbon sheet interleaved in each set of sheets by inserting separate carbon sheets by hand is impracticable, owing to the excessive cost for labor. It is essential therefore that some method be adapted to effect this interleaving by machinery. I employ for this purpose mechanism whereby the carbon paper may be interleaved in web form with the webs of paper from which the original sheets and duplicates are formed, the composite web being thereafter cut off in lengths, the cut off lengths superimposed and bound together, if desired, in any suitable manner and finally cut into a plurality of individual books or sets of forms.

I am aware that it has been proposed by others to use a separate carbon sheet for each original; but heretofore it has been entirely impracticable, owing to the excessive cost and great bulk of the books when known types of carbon paper were employed, and no such book has ever been put on the market to my knowledge by any of the manufacturers producing counter check books. Such a book is, as far as I am aware, only a practicable commercial proposition when made with the carbon paper described and by the process above referred to and hereinafter more fully described.

The invention is illustrated in the accompanying drawings in which

Figure 3:
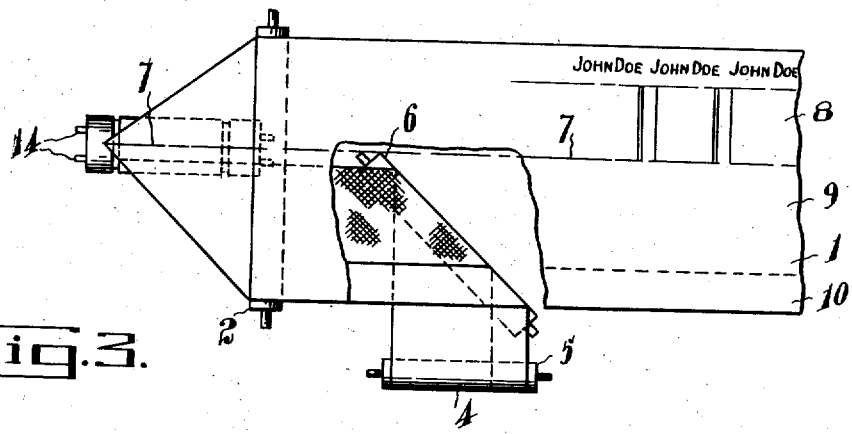
Figure 4:
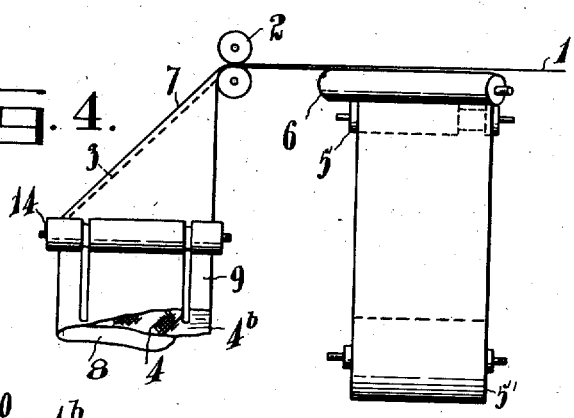
Figure 10:
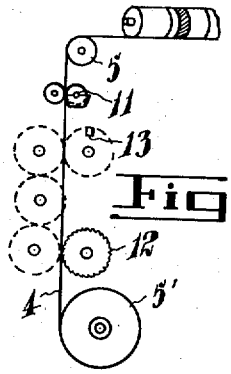
Figure 9:
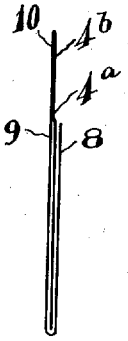
Figure 5:
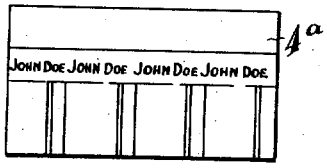
Figure 8:
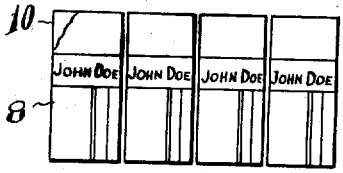
Figure 6:
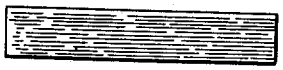
Figure 7:
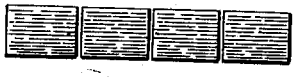

Fig. 1 is a plan view of the carbonized side of my new carbon sheet;

Fig. 2 a perspective view of a manifolding book constructed in accordance with my invention;

Fig. 3 a diagrammatic plan view of the mechanism for interleaving the carbon sheets;

Fig. 4 a side elevation showing gumming, numbering and perforating means that may be employed;

Fig. 5 a plan view of part of a web of paper folded over a web of carbon paper cut off ready for superimposition on a plurality of like parts;

Fig. 6 an end elevation of the pile of superimposed parts;

Fig. 7 a similar view showing the pile cut into individual books;

Fig. 8 a plan view of the same;

Fig. 9 a side elevation of an original and a duplicate sheet showing a carbon sheet gummed to the duplicate sheet; and Fig. 10 an end elevation of part of Fig. 4 diagrammatically showing a gummer.

In the drawings like numerals of reference indicate corresponding parts in the different figures.

Referring particularly to Figs. 3 and 4 of the drawings, 1 is a printed web of paper from which the originals and duplicates of the book are to be formed. This is shown as of sufficient width to form both originals and duplicates. This web is led between rollers 2 which will be suitably driven and thence passes over the folder 3 and down between the rollers 14.

The carbon paper web 4 passes from the supply roll 5′ over a roll 5 and round a diagonal roller 6, or is otherwise led to pass to the rollers 2 with the web of printed paper.

The carbon paper web preferably has a non-carbonized margin $4^b$ as shown in Figs. 1 and 3, and the other edge of said web is shown as extending only to a point at or near the line of fold 7 so that emerging from the rollers 14 we have a composite web comprising a web of carbon interposed between the folded parts of the web 1. The fold is so positioned that the part 8 from which the originals are formed is narrower than the part 9 from which the duplicates are formed. A margin 10 is thus formed on the duplicates by means of which they may be bound together, leaving the adjacent ends of the originals free.

The non-carbonized margin $4^b$ of the carbon web overlies this margin 10 so that the carbon sheets may be bound in with the duplicates. This composite web is then cut off into lengths sufficient to make, say, four books, and a sufficient number of these lengths then superimposed to form books of the required capacity.

The superimposed lengths are then bound together along the margins 10, and then cut to form the individual books.

A manila cover may be applied either before or after the final cutting.

The result is a book such as shown in Fig. 2, in which a set of leaves comprises a duplicate $9^a$ and a carbon sheet $4^a$ bound in together and an original $8^a$ folded over the carbon sheet and having its end adjacent the stub of the book entirely free. As there will usually be fifty sets of leaves in a book, there will also be fifty separate carbon sheets.

Both the carbon sheets and duplicates may be perforated to facilitate their removal, or, if the carbon sheets are to remain attached to the stub, they may be made so as not to extend to the juncture of the originals and duplicates (see Fig. 2) so that these may be grasped adjacent their juncture and torn out without disturbing the carbon sheet. The carbon sheets may also be numbered for identification purposes so that the carbon sheet of any given bill may be readily found and the sheet used as a copy, since it will be found that, the carbon having been removed wherever an impression has been transferred, a very legible record remains on the carbon sheet.

While it is preferable to bind the carbon sheets into the books, I do not wish to restrict myself to this method of securing the sheets in position for use as they may readily be secured by gumming to either the original or duplicate sheets. Preferably this is done by gumming the web of carbon paper as it is fed into the folding apparatus, the gummed edge being pressed firmly into contact with the web of paper next to which it lies.

In Fig. 10 I show a gummer 11 suitably positioned to gum one edge of the carbon web, also a perforator 12 and a numbering device 13. These devices are well known in the trade and need no detailed description.

Books or sets of forms constructed in the manner described possess, from the users' standpoint, all the advantages of manifolding books heretofore used in the art with none of their disadvantages and can be made at a cost which will enable them to be sold at a price as favorable to the user as that of the older forms with which they will compete.

By book is meant any aggregation of sets of leaves no matter whether permanently bound together or not, and includes any aggregation of leaves held together by any form of loose leaf binder.

By binding is to be understood any means of connecting the sets of sheets together whether by stitching, gumming, padding or otherwise.

What I claim as my invention is:

1. In a process of forming manifold books, the steps of folding a web of paper and leaving a single thickness thereof along one margin, and interleaving a transfer web between the folds with one margin of said transfer web overlying the said single thickness margin of the web of paper.

2. A process of forming manifold books comprising the steps of producing a web of paper having rows of printed forms thereon, placing a web of transfer paper having a non-transfer margin over one of said rows of forms with said margin of the transfer web alined with one margin of the printed web, folding said printed web over said transfer web without overlapping the alined margins of the transfer and printed webs and thus interleaving the transfer web, having the non-transfer margin, between the folds with the non-transfer margin overlying the said single thickness margin of the web of paper.

3. A process of forming manifold books comprising the steps of producing a web of paper having rows of printed forms thereon, placing a web of transfer paper having a non-transfer margin over one of said rows of forms with said margin of the transfer web alined with one margin of the printed web, folding said printed web over said transfer web without overlapping the alined margins of the transfer and printed webs, and thus interleaving the transfer web, having the non-transfer margin, between the folds with the non-transfer margin overlying the said single thickness margin of the web of paper and its other edge extending to a point short of the fold line of the paper web.

4. In a process of forming manifold books, the steps of folding a web of paper and leaving a single thickness thereof along one margin, and interleaving a transfer web between the folds with one margin of said transfer web overlying the said single thickness margin of the web of paper and the other margin of said transfer web extending to a point short of the fold line of the paper web.

5. A process of forming manifold books comprising the steps of producing a web of paper having rows of printed forms thereon, placing a web of transfer paper over one of said rows of forms with one margin of the transfer web alined with one margin of the printed web, and folding said printed web over said transfer web without overlapping the alined margins of the transfer and printed webs.

6. A process of forming manifold books comprising the steps of producing a web of paper having rows of printed forms thereon, placing a web of transfer paper over one of said rows of forms with one margin of the transfer web alined with one margin of the printed web, folding said printed web over said transfer web without overlapping the alined margins of the transfer and printed webs, cutting off lengths from the composite web, superimposing a plurality of said cut-off lengths, binding the superimposed lengths along the margins where the edges of the transfer web coincide with the edges of the printed web, and finally cutting the bound lengths into a plurality of individual books.

7. In a process of forming manifold books, the steps of folding a web of paper and leaving a single thickness thereof along one margin, interleaving a transfer web between the folds with one margin of said transfer web overlying the said single thickness margin of the web of paper, and adhesively securing the marginal portions of the webs together.

8. In a process of forming manifold books, the steps of folding a web of paper and leaving a single thickness thereof along one margin, interleaving a transfer web between the folds with one margin of said transfer web overlying the said single thickness margin of the web of paper and the other margin of said transfer web extending to a point short of the fold line of the paper web, and adhesively securing a marginal portion of the transfer web to an adjacent fold of the paper web.

9. In a process of forming manifold books, the steps of folding a web of paper and leaving a single thickness thereof along one margin, interleaving between the folds a transfer web having an uncarbonized margin; and adhesively securing said uncarbonized margin to an adjacent fold of the paper web.

10. In a process of forming manifold books, the steps of folding a web of paper and leaving a single thickness thereof along one margin, interleaving between the folds a transfer web having an uncarbonized margin with said margin overlying the simple thickness margin of the web of paper; and adhesively securing the marginal portions together.

ALBERT R. LAWSON.